(No Model.) 2 Sheets—Sheet 2.

A. H. JELLY.
CAR PROVIDED WITH FENDERS.

No. 519,714. Patented May 15, 1894.

WITNESSES
J. M. Hartnett
B. W. Williams

INVENTOR
Arthur H. Jelly
By his Atty
Henry Williams

UNITED STATES PATENT OFFICE.

ARTHUR H. JELLY, OF CAMBRIDGE, MASSACHUSETTS.

CAR PROVIDED WITH FENDERS.

SPECIFICATION forming part of Letters Patent No. 519,714, dated May 15, 1894.

Application filed November 3, 1893. Serial No. 489,965. (No model.)

*To all whom it may concern:*

Be it known that I, ARTHUR H. JELLY, a citizen of the United States, residing at Cambridge, in the county of Middlesex and State of Massachusetts, have invented a new and useful Improvement in Cars Provided with Fenders, of which the following is a specification.

This invention relates to that class of cars, preferably street cars, which are provided with fenders, and particularly to that class in which the fenders are held normally raised above the track and are adapted to be dropped upon the track in case an obstruction appears in front of the car.

The invention has for its object to render possible the speedy and certain stoppage of the car in case of an impending accident as well as the instant dropping of the fender, and to this end the device operates to shut off the motive power, and set the brakes substantially simultaneously with the dropping of the fender.

The nature of the invention is fully described below, and illustrated in the accompanying drawings, in which—

Figure 1:
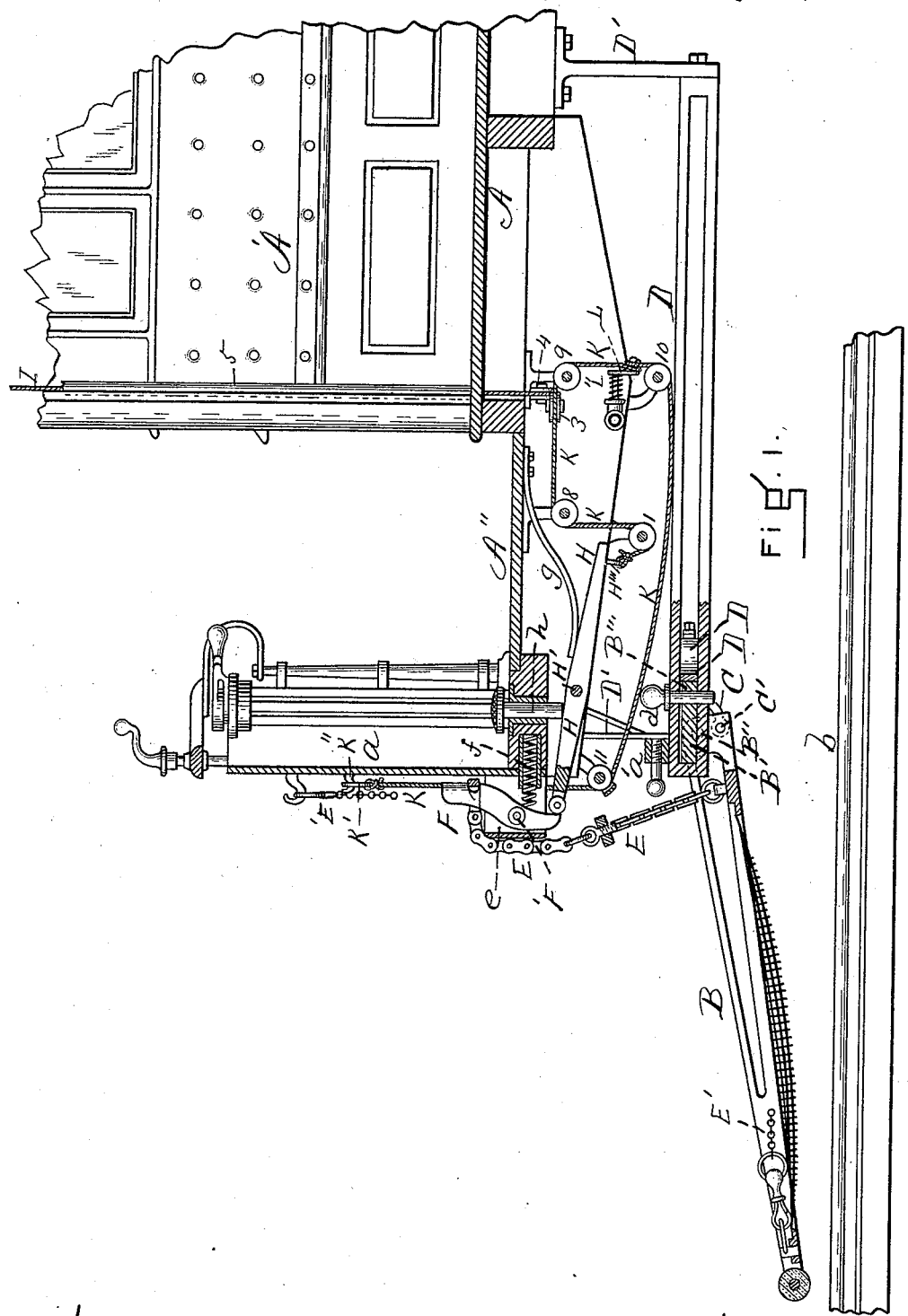
Figure 2:
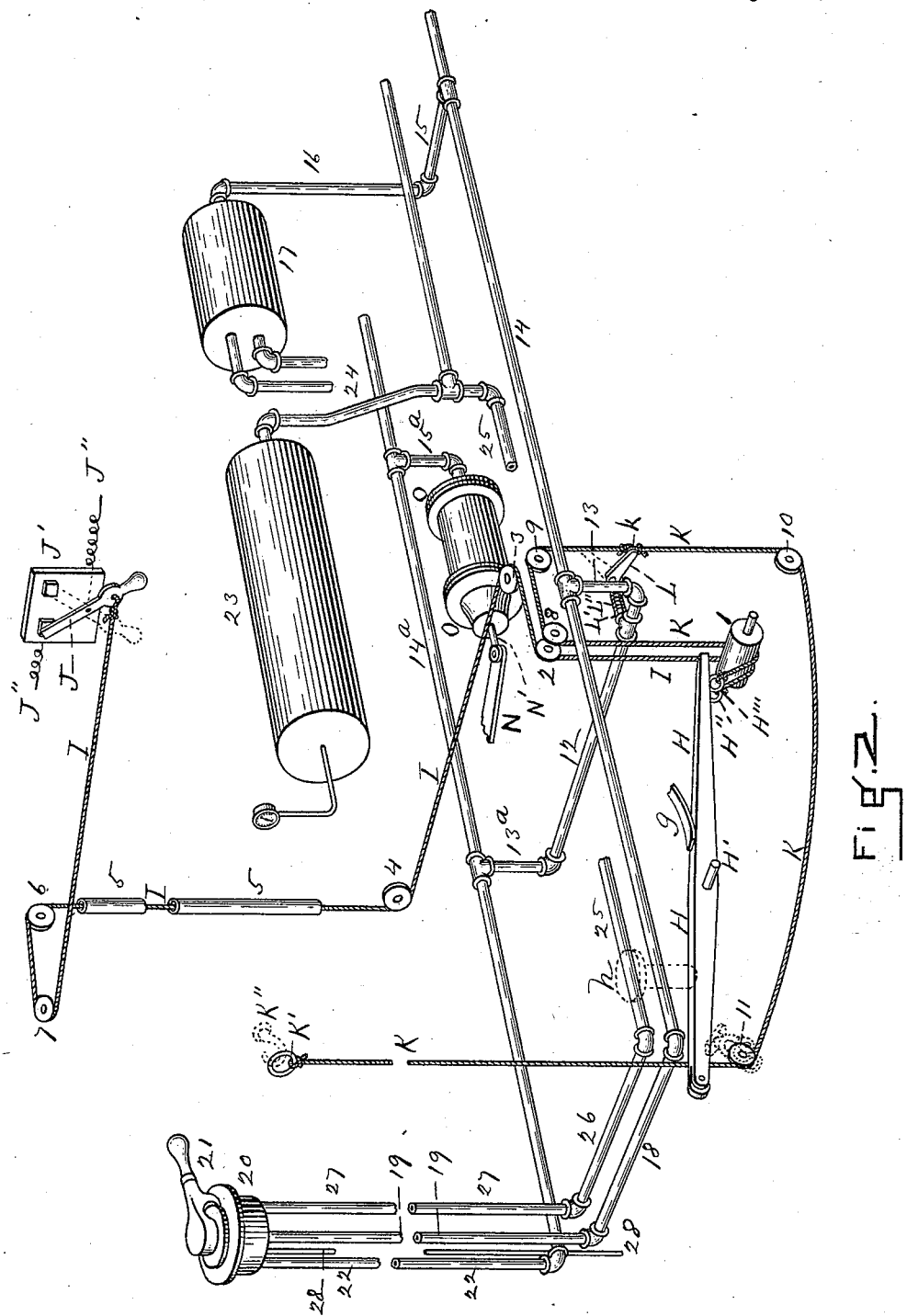

Figure 1 is a sectional side elevation of a portion of an electric car embodying my invention. Fig. 2 is a perspective view showing the air brake mechanism, and switching mechanism, and the lever connecting them with the fender.

Similar letters and numerals of reference indicate corresponding parts.

A represents the floor and A' the body of an electric car.

A'' is the platform, a the dash board, and a' the brake support.

b is a rail of the car track.

I will first briefly describe the operation of the fender illustrated in the drawings, said fender, of itself considered, not being claimed in this application, as most of its parts are shown and described in my application filed July 11, 1893, and numbered 480,113, and the rest in my application of even date herewith, both said applications being for improvements in car fenders.

B is a fender whose side arms are hinged at the upper portions of their rear ends to the cross bar at B'', and at the lower portions of their rear ends at C' to the links C connecting with the opposite ends of a curved spring D which extends horizontally transversely with the car body, and bears at its central portion against the rearward extension B''' of the sliding cross bar B'. This cross bar slides longitudinally with the car in the slideway produced by the bar D set longitudinally beneath the car and supported by hangers D'. A bolt or pin d prevents the fender from sliding back while in use. The fender is held normally raised from the track by the chain E, whose upper end catches over the catch F pivoted at F' in the hollow bunter e, the spring f pressing against the lower portion of said catch. A trip lever H is pivoted at H' to the car body, and its forward end is held normally up against the lower end of the catch F by the spring g. A bolt h, accessible to the motor-man, extends through the platform A and rests on the lever H in front of its pivotal point. In case of danger, the motor-man presses the bolt h, forcing down the front end of the trip lever H, releasing the catch and allowing its upper end to fly forward, and hence letting the front end of the fender drop upon the track, from which position it may be raised again by the driver by means of the chain E' (a portion of which is broken out). The spring D presses the fender upon the track and prevents it from jumping. All the above is described in my said patent application.

The rear end of the trip lever H has secured to it at H'' one end of a cord I, which passes under a drum or pulley 1, over a pulley 2, around a pulley 3, under a pulley 4, through a vertical tube 5, and around pulleys 6, and 7 to the electrical switch J on the switchboard J', from which wires J'' extend to the source of electricity. The pulleys 1, 2, 3, and 4 are secured in any manner to the car body beneath the floor, and the pulleys 6 and 7, and tube 5 are secured to the front end of the car body. The switch J is usually above the door. As will readily be seen, when the motor-man drops the fender, from fear of impending accident, the rear end of the trip lever H is moved up, drawing on the cord I and moving the switch J, thus shutting off the current of electricity, so that when the fender drops the power is shut off at practically the same time. The switch can be easily replaced by the driver, as it is within reach. The rear end of the trip lever H has secured to it at H''' a cord K, which passes over, around and under the drum 1 and pulleys 8, 9, 10, and 11, secured to the car, up to the dash board a, on the front side of which the other end of the cord is hung by means of a ring K' and hook K''. At k the outer end of the lever L is secured to the cord K. This lever has its inner end supported by a spindle L', and a spring L'' secured to said spindle and lever holds the outer end of the latter normally down and keeps the cord K taut between the point k and the lever H. This spindle actuates the valve in the air brake mechanism, which is not new in itself considered, and may be briefly described as follows: The pipe 12, in which said valve is situated, connects at one end by means of the branch 13, pipe 14, branch 15, and pipe 16, with the auxiliary reservoir 17 connected with the pump. The other end of the pipe 12 connects by means of the branch 13$^a$, pipe 14$^a$ and branch 15$^a$ with the "jam," or brake cylinder O, which connects with the brake lever N by means of the piston N'. The pipe 14 is connected by means of the pipes 18 and 19 with the valve 20 provided with the valve handle 21. The pipe 14$^a$ is connected by means of the pipe 22 with the valve. The main reservoir 23 is connected by pipes 24, 25, (broken out,) 26, and 27 with the valve 20.

28 is the exhaust. This arrangement needs no further description, as it is a common air brake mechanism. When the rear end of the trip lever H is raised by pressing down the bolt h, the pull on the cord K draws up the lever L and sets the brake. Thus it will be seen that when the motor-man presses on the bolt h to drop the fender, the motive power is shut off and the brake is set practically at the same time. Thus all three combine to prevent an accident. The valve in the air brake is returned to its original position automatically by the spring L''. In case this spring should become broken, the valve could be operated by the driver, as the cord K would be accessible.

Having thus fully described my invention, what I claim, and desire to secure by Letters Patent, is—

1. In a car, in combination, a car fender comprising a unitary or rigid frame vertically hinged at its rear end to a car and with its front end held normally in a slightly raised position from the road-bed or track, a mechanism within control of the motor-man for the release of the fender from said raised position, and a spring acting at all times as a constantly downwardly forcing spring upon the front end of the fender whereby said front end is held down to its slightly raised position and when tripped is held firmly and constantly on the road-bed, substantially as set forth.

2. In combination with a car, a fender adapted to be dropped from a normally raised position, the trip lever H, the electrical switching mechanism for cutting out the power, and the cord I extending from said lever over suitable pulleys to said switching mechanism, substantially as set forth.

3. In combination with a car, a fender adapted to be dropped from a normally raised position, the trip lever H, cord I extending from said lever over suitable pulleys to the switch J, an electrical switching mechanism for cutting out the power, cord K extending from said lever over suitable pulleys to the lever L, spindle L', and an air brake mechanism operated by said spindle, substantially as set forth.

ARTHUR H. JELLY.

Witnesses:
HENRY W. WILLIAMS,
J. M. HARTNETT.